United States Patent [19]

Hasegawa et al.

[11] Patent Number: 5,157,096

[45] Date of Patent: Oct. 20, 1992

[54] METHOD AND APPARATUS FOR PREPARING ORGANIC SILAZANE POLYMER AND METHOD FOR PREPARING INORGANIC FIBERS

[75] Inventors: Yoshio Hasegawa, Ibaraki; Minoru Takamizawa, Tokyo; Akira Hayashida, Higashimurayama; Yoshihumi Takeda, Joetsu, all of Japan

[73] Assignees: Shin-Etsu Chemical Co., Ltd., Tokyo; The Foundation: The Research Institute for Special Inorganic Materials, Ibaraki, both of Japan

[21] Appl. No.: 554,129

[22] Filed: Jul. 17, 1990

[30] Foreign Application Priority Data

Jul. 18, 1989 [JP] Japan .................................. 1-185756
Jul. 18, 1989 [JP] Japan .................................. 1-185757
Jul. 18, 1989 [JP] Japan .................................. 1-185758

[51] Int. Cl.$^5$ .......................................... C08G 77/04
[52] U.S. Cl. .......................................... 528/37; 528/33; 528/38
[58] Field of Search .......................... 528/33, 38, 37

[56] References Cited

U.S. PATENT DOCUMENTS

| | | | |
|---|---|---|---|
| 3,853,567 | 12/1974 | Verbeek | 501/92 |
| 4,535,007 | 8/1985 | Cannady | 428/689 |
| 4,540,803 | 9/1985 | Cannady | 556/412 |
| 4,543,344 | 9/1985 | Cannady | 501/95 |
| 4,650,773 | 3/1987 | Okamura et al. | 501/56 |
| 4,761,389 | 8/1988 | Rabe et al. | 501/95 |
| 4,937,304 | 6/1990 | Ayama et al. | 528/38 |
| 4,992,523 | 2/1991 | Bacque et al. | 528/38 |

FOREIGN PATENT DOCUMENTS 0266918  5/1988  European Pat. Off. .

*Primary Examiner*—Melvyn I. Marquis
*Attorney, Agent, or Firm*—McAulay Fisher Nissen Goldberg & Kiel

[57] ABSTRACT

An organic silazane polymer is prepared by passing a silazane compound in vapor form through a hollow tube heated at 400° to 700° C. for activation and thermally polymerizing the silazane compound in a liquid phase. Inorganic fibers can be prepared from the organic silazane polymer by melt spinning, infusibilizing, and sintering. An apparatus for preparing an organic silazane polymer is also provided, comprising a heated reactor vessel for evaporating and thermally polymerizing a silazane compound, a heated hollow tube in flow communication with said reactor vessel for receiving the silazane compound vapor and heating it at 400° to 700° C. for activation, and a conduit, with a condenser for condensing the vapor, for feeding the condensed silazane compound back to the reactor.

1 Claim, 8 Drawing Sheets

METHOD AND APPARATUS FOR PREPARING ORGANIC SILAZANE POLYMER AND METHOD FOR PREPARING INORGANIC FIBERS

This invention relates to a method and apparatus for preparing an organic silazane polymer suitable as a precursor for a ceramic material. It also relates to a method for preparing inorganic fibers from the organic silazane polymer.

BACKGROUND OF THE INVENTION

Great attention has been paid to ceramic materials for their heat resistance, wear resistance, high-temperature strength and other advantages. However, ceramic materials are extremely difficult to mechanically work since they are hard and brittle. Thus most ceramic articles are prepared by sintering and precursor methods. The sintering method involves the step of pressing or otherwise molding a ceramic material in powder form into a desired shape followed by sintering. The precursor method is by melting an organic polymer as a ceramic precursor or dissolving it in a suitable solvent, molding the melt or solution into a desired shape, and then sintering for converting the polymer into inorganic form. The precursor method is characterized by the potential manufacture of ceramic articles to a configuration which cannot be achieved with the powder sintering method, and especially adapted for the manufacture of fibers.

Among ceramics, SiC and Si$_3$N$_4$ are of great interest for high-temperature performance, more particularly because of heat resistance and high-temperature strength for the former and thermal shock resistance and fracture toughness for the latter. Extensive research works have been made on their precursors. The silicon carbide and nitride ceramic materials are also considered useful as reinforcements for fiber-reinforced composite materials by taking into account their light weight, heat resistance, and high strength features. Thus integration of these ceramics with plastics, metals and other ceramics is also an important subject.

In the prior art, ceramic fibers are prepared by forming an organic silazane polymer through pyrolytic polymerization and converting the polymer as a precursor into ceramic fibers composed of SiC and Si$_3$N$_4$ as described in U.S. Pat. No. 3,853,567 (Japanese Patent Publication No. 46995/1980). This method produces an organic silazane polymer by heating a silazane compound resulting from a methylchlorosilane and an amine to a temperature in the range of from 200° to 800° C. and polymerizing the compound in a Raschig ring packed column. This method has the following problems.

(1) Only limited reactants are available. The patent specification sets forth only methyltrichlorosilane and dimethyldichlorosilane as the methylchlorosilane and monomethylamine as the amine.

(2) This method produces an organic silazane polymer by passing a monomer or silazane compound through a column loaded with packings such as Raschig rings. As will be evident from Comparative Example described later, this method allows the monomer to polymerize upon contact with the packings, but the extended contact with the packings can cause some polymers to convert into higher polymers. Such insoluble, infusible, highly polymerized solids will gradually accumulate in the column, disturbing further continuation of polymerization reaction.

(3) The method based on a Raschig ring packed column allows a considerable amount of a crystalline by-product of the structure represented by formula (1) below to form. The by-product precipitates and deposits on the gas phase-defining interior wall of the reactor, participating in reaction no longer. As a result, the end organic silazane polymer is obtained in a low yield of 36%.

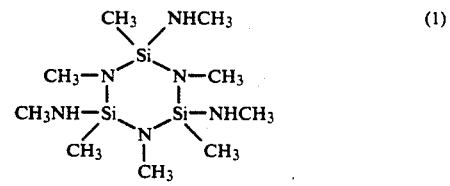

(4) The resulting organic silazane polymer is less resistant against hydrolysis.

For these drawbacks, the method of U.S. Pat. No. 3,853,576 is difficult to commercially effectively prepare an organic silazane polymer which is a ceramic precursor.

Most often, ceramic fibers are prepared by spinning an organic silazane polymer, infusibilizing and sintering the polymer to render it inorganic. The above-cited U.S. Pat's method has the following problems in the fiber-forming procedure.

(1) The organic silazane polymer tends to increase its melting point in a spinning bath which is formed by heating and melting the polymer. The melt is thermally less stable and less spinnable so that frequent breakage occurs during spinning.

(2) Since the organic silazane polymer is less resistant against hydrolysis, it is likely to take in oxygen during fiber formation so that there are obtained fibers of poor quality.

(3) The resulting ceramic fibers have low strength.

(4) Ceramic retention is low.

Therefore, the above-mentioned method is not adapted for commercially effective manufacture of inorganic fibers of quality consisting essentially of Si, C, and N. It is thus desired to overcome these drawbacks.

Further, since the above-mentioned method produces ceramic fibers composed mainly of SiC-Si$_3$N$_4$, it is not applicable to the preparation of silicon nitride fibers, that is, fibers composed mainly of Si and N.

Many methods are known in the art for the preparation of ceramic fibers of silicon nitride, for example, Japanese Patent Application Kokai (JP-A) No. 135431/1985 (U.S. Pat. Nos. 4,540,803 and 4,543,344), JP-A 125015/1987, JP-A 12915/1986 (U.S. Pat. No. 4,650,773), and JP-A 232270/1986 (U.S. Pat. No. 4,761,389). The methods of JP-A 135431/1985 and 125015/1987 suffer from a problem associated with organic silazane polymer precursors being less resistant against hydrolysis. It is inevitable for oxygen to incorporate into ceramic fibers during fiber formation so that the fibers have an uncontrolled content of oxygen and become deteriorated in strength and heat resistance. JP-A 12915/1986 or U.S. Pat. No. 4,650,773 discloses a method for preparing silicon nitride fibers in an atmosphere of ammonia gas. Instead of the organic silazane polymer, this method uses a polycarbosilane precursor which is commercially produced in low yields and thus expensive and uneconomical. Further, JP-A 232270/1986 or U.S. Pat. No. 4,761,389 discloses a method for sintering a polycarbosilane or polysilazane in an ammonia-containing atmosphere. The object of this method is to produce a ceramic material having a reduced carbon content. Although a ceramic material approaching the stoichiometric composition of silicon nitride (Si 60% and N 40%) can be produced by minimizing the carbon content, the resulting ceramic material has a substantially reduced nitrogen content and a markedly reduced strength. This suggests the presence of a substantial amount of oxygen, indicating a potential lack of quality.

Therefore, the above-mentioned methods are not adapted for commercially efficient manufacture of inorganic fibers of quality consisting essentially of Si and N. It is thus desired to overcome these drawbacks.

SUMMARY OF THE INVENTION

Therefore, a first object of the present invention is to provide a novel and improved method and apparatus for efficiently preparing an organic silazane polymer in high yields which is suitable as a ceramic precursor in preparing ceramic articles of quality, typically ceramic fibers of $SiC-Si_3N_4$ system.

A second object of the present invention is to provide a novel and improved method for commercially efficiently preparing inorganic fibers of quality consisting essentially of Si, C, and N from an organic silazane polymer having excellent properties as a commercially advantageous ceramic precursor.

A third object of the present invention is to provide a novel and improved method for commercially efficiently preparing silicon nitride fibers of quality consisting essentially of Si and N from an organic silazane polymer having excellent properties as an anti-hydrolysis ceramic precursor.

The inventors have found that an organic silazane polymer having improved hydrolysis resistance, thermal stability, and workability can be continuously and efficiently produced in high yields by passing a silazane compound in vapor form, more illustratively a silazane compound of the formula:

   [I]

or

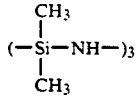   [II]

through a hollow tube heated at a temperature in the range of from 400° to 700° C. for activating the silazane compound, and thermally polymerizing the silazane compound in a liquid phase, typically at a temperature of 300° to 600° C. We have further found that this organic silazane compound is a useful precursor for producing ceramic articles because ceramic fibers of $SiC-Si_3N_4$ having improved tensile strength, modulus of elasticity, and high-temperature strength can be obtained by melt spinning, making infusible, and sintering the organic silazane compound.

More particularly, insofar as an organic silazane compound is prepared as above, quality ceramic fibers consisting essentially of Si, C, and N and having a tensile strength of at least 280 kg/mm², a modulus of elasticity of at least 19 ton/mm², and a high ceramic retention can be commercially advantageously produced by melt spinning, making infusible, and sintering the organic silazane compound with benefits that neither substantial change in melting point and molecular weight of the organic silazane compound nor breakage occurs during spinning and that the organic silazane compound is smoothly spinnable.

Similarly, quality ceramic fibers consisting essentially of Si and N and having a tensile strength of at least 260 kg/mm², a modulus of elasticity of at least 18 ton/mm², and a high ceramic retention can be commercially advantageously produced by melt spinning the organic silazane compound, making infusible, and sintering the fiber in an inert atmosphere containing ammonia. The present invention is predicated on these findings.

It should be understood that silazane compounds are inherently susceptible to water so that Si-N-Si bonds undergo hydrolysis to form Si-O-Si bonds while giving off ammonia, resulting in fibers having a markedly increased surface area which is undesirable from the standpoint of fiber quality. Quite unexpectedly, the organic silazane polymer of the invention is less prone to hydrolysis, that is, has higher hydrolysis resistance than the precursor disclosed in U.S. Pat. No. 3,853,567.

According to a first aspect of the present invention, there is provided a method for preparing an organic silazane polymer, comprising the steps of passing a silazane compound in vapor form through a hollow tube heated at a temperature in the range of from 400° to 700° C. for activating the silazane compound, and thermally polymerizing the silazane compound in a liquid phase.

According to a second aspect of the present invention, there is provided an apparatus for preparing an organic silazane polymer, comprising a reactor vessel for evaporating and thermally polymerizing a silazane compound; a first heater for heating the reactor vessel; a hollow tube having an inlet and an outlet, the tube inlet being in flow communication with the reactor vessel for receiving the silazane compound in vapor form from the reactor vessel; a second heater for heating the tube such that its interior reaches a temperature of 400° to 700° C. whereby the silazane compound vapor is heated to the temperature for activation; and a conduit extending from the tube outlet to the reactor vessel and having located therein a condenser for condensing the silazane compound vapor, the conduit serving for feeding the condensed silazane compound back to the reactor vessel.

According to a third aspect of the present invention, there is provided a method for preparing an inorganic fiber, comprising the steps of passing a silazane compound in vapor form through a hollow tube heated at a temperature in the range of from 400° to 700° C. for activating the silazane compound, thermally polymerizing the silazane compound in a liquid phase to form an organic silazane polymer, melt spinning the organic silazane polymer into a fiber, and infusibilizing and sintering the fiber.

An inorganic fiber predominantly comprising Si, C, and N is formed when the fiber is sintered in vacuum, an inert gas or hydrogen gas. An inorganic fiber predominantly comprising Si and N is formed when the fiber is sintered in an inert atmosphere containing ammonia.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

The method for preparing an organic silazane polymer according to the invention starts with silazane compounds having a silicon-to-nitrogen bond. A variety of silazane compounds are useful starting reactants although silazane compounds whose substituent is a methyl group are recommended for commercial availability, low cost, and ease of handling. The preferred silazane compounds are those having the following formulae [I] and [II].

$$(CH_3)_3Si-NH-Si(CH_3)_3 \quad [I]$$

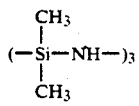

$$\begin{array}{c} CH_3 \\ | \\ (-Si-NH-)_3 \\ | \\ CH_3 \end{array} \quad [II]$$

According to the present method, the feed stock or silazane compound is evaporated, the vapor is passed through a heated hollow tube for activation, and the activated compound is thermally polymerized in a liquid phase.

An apparatus suitable for preparing a silazane polymer according to this procedure includes a reactor vessel for evaporating a silazane compound into a vapor and for thermally polymerizing the compound; a first heater for heating the reactor vessel; a hollow tube or column having an inlet and an outlet, the tube inlet being in flow communication with the reactor vessel for receiving the silazane compound vapor from the reactor vessel; a second heater for heating the tube such that its interior reaches a temperature of 400° to 700° C. whereby the silazane compound vapor is heated to the temperature for activation; and a conduit extending from the tube outlet to the reactor vessel and having located therein a condenser for condensing the silazane compound vapor, the conduit serving for feeding the condensed silazane compound back to the reactor vessel.

Figure 1:
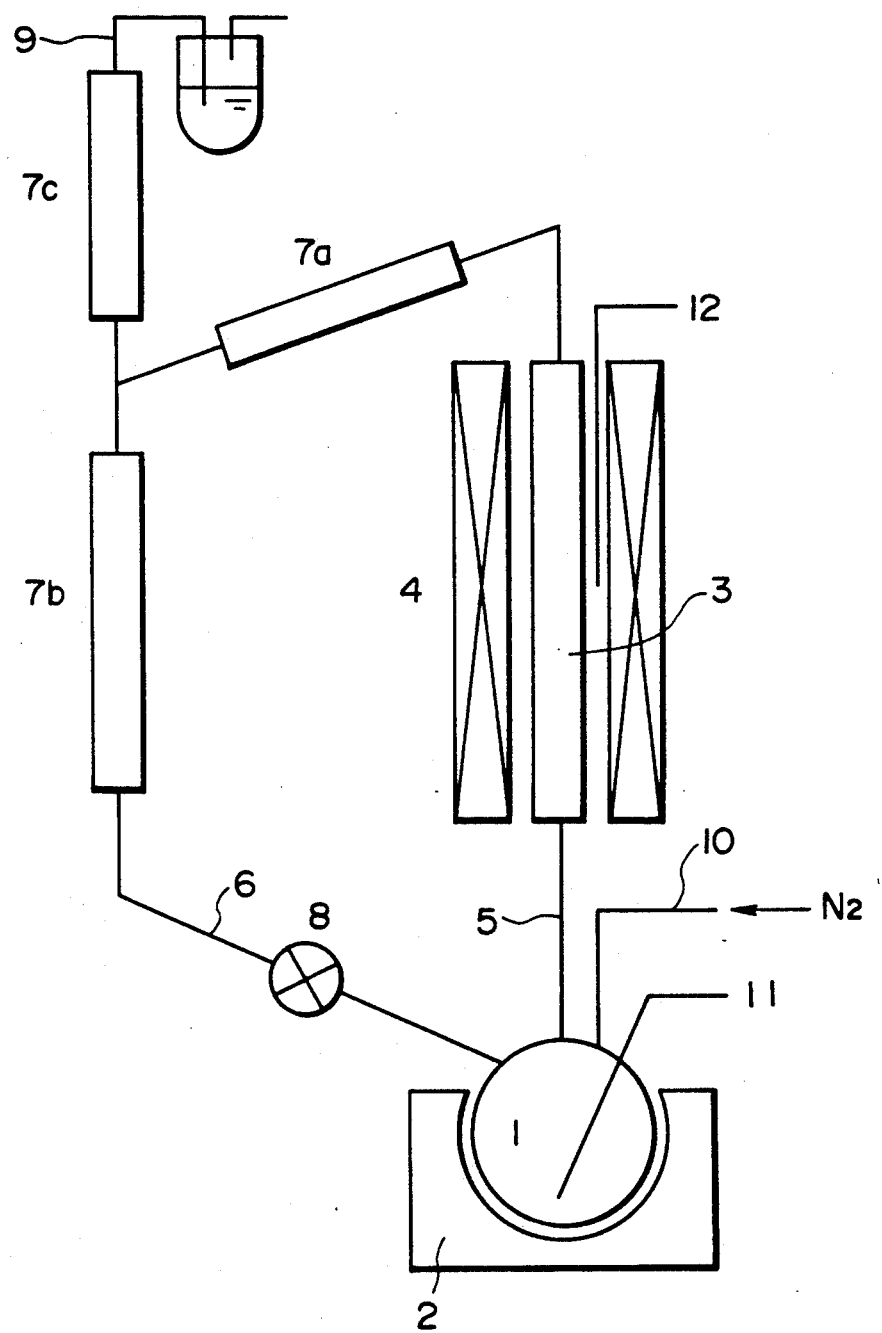
FIG. 1 is a schematic illustration of an apparatus according to one embodiment of the invention.

Referring to FIG. 1, there is illustrated one embodiment of the apparatus as comprising a reactor vessel 1 which is charged with a silazane compound. The reactor vessel 1 serves not only to evaporate the silazane compound into a vapor, but also to thermally polymerize the compound. A first heater in the form of a heating mantle 2 is disposed about the reactor vessel 1 for heating it. A hollow tube or column in the form of a quartz tube 3 having an inlet and an outlet is vertically disposed above the vessel and enclosed on the outer periphery with a tubular heater in the form of an electric furnace 4. The tube at its lower end or inlet is in flow communication with the reactor vessel 1 through an inlet line 5 for receiving the silazane compound vapor from the reactor vessel 1. The heater 4 heats the tube 3 such that its interior reaches a temperature of 400° to 700° C. whereby the silazane compound vapor is heated to the temperature for activation. A return conduit 6 extends from the tube at its upper end or outlet to the reactor vessel 1. First and second condensers 7a and 7b are located in the conduit 6 for condensing the silazane compound vapor which has been heated and activated at 400° to 700° C. in the tube 3. The conduit 6 serves to feed the condensed silazane compound back to the reactor vessel 1. A valve 8 is located in the conduit 6 downstream of the second condenser 7b. A branch 9 having a third condenser 7c is connected at one end to the conduit 6 between the first and second condensers 7a and 7b and at the opposite end to the exterior through a liquid seal such as silicone oil for purging noncondensing decomposition gases to the exterior. A line 10 is connected to the reactor vessel 1 for introducing nitrogen therein. Thermocouples 11 and 12 are associated with the vessel 1 and the tube 3, respectively.

The apparatus shown in FIG. 1 permits the reaction to effectively take place so that an organic silazane polymer may be readily produced. More particularly, the reactor 1 is charged with a feed stock which is a silazane compound. The silazane compound is evaporated into a vapor by heating the vessel by means of the heating mantle 2. The vapor is transferred to the quartz tube 3 which is externally heated to a predetermined temperature by means of the electric furnace 4. Thus part of the silazane vapor is activated in the tube 3. Part of the activated silazane compound falls down from the tube 3 back to the vessel 1 through the inlet line 5 while the remaining activated silazane compound along with the unreacted vapor advances past the upper end or outlet of the tube 3 and enters the conduit 6 system where they are cooled and condensed by means of the condensers 7a, 7b, and 7c and fed back to the vessel 1 through the valve 8 which is controlledly opened. The activated silazane compound thus fed back to the vessel 1 is thermally polymerized in a liquid phase in the vessel. Low molecular weight constituents and the silazane compound feed stock are again subjected to evaporation and activation in a similar sequence.

The hollow column functioning to activate the silazane compound feed stock is heated such that its interior reaches a temperature in the range between 400° C. and 700° C., preferably between 650° C. and 690° C. for hexamethyldisilazane and between 550° C. and 650° C. for hexamethylcyclotrisilazane. Only a limited proportion of the silazane compound is activated at interior temperatures of lower than 400° C. Interior temperatures of higher than 700° C. are industrially undesirable because solids having a high degree of polymerization can form in the column. Within the temperature range defined herein, the blockage of the column with higher polymeric solids is avoided.

The reactor vessel is heated to such temperatures that the silazane compound feed stock may be effectively evaporated and the activated silazane compound may be thermally polymerized efficiently. Preferably, the reactor vessel interior is heated to a temperature of 300° to 600° C., more preferably 400° to 500° C. At temperatures lower than 300° C., more feed stock would remain unreacted or more low molecular weight polymers would form, reducing the yield of the desired organic silazane polymer. At temperatures higher than 600° C., polymerization would proceed to an excess degree, resulting in an organic silazane polymer having a higher melting point and becoming less workable. Preferably the interior temperature of the reaction vessel is gradually raised as the reaction proceeds. This is because lower molecular weight components and the silazane compound feed become rather difficult to evaporate as the concentration of polymer in the reactor increases with thermal polymerization of the activated component. It is desired to terminate the polymerization reaction when the reaction vessel interior reaches the temperature at which the polymer's molecular weight has increased to such an extent that the remaining small amount of lower molecular weight components and silazane compound feed can be evaporated no longer to obtain a polymer of a desired molecular weight.

It is to be noted that the thermal polymerization time when the silazane compound vapor is passed through the column generally ranges from about 1 to about 10 hours.

The thus produced organic silazane polymer may be utilized as a ceramic precursor simply by removing the lower molecular weight components in a conventional manner. Most often, the lower molecular weight components are distilled off by heating the reaction product in an inert atmosphere under atmospheric or reduced pressure.

The method of the invention can also be performed in a continuous mode without interrupting the reaction. Part of the produced polymer is continuously withdrawn from the reactor vessel of the illustrated apparatus and at the same time, the silazane compound feed is made up in corresponding amounts.

The organic silazane polymer prepared in this way has many advantages associated with its preparation including high yield, high efficiency, and low cost as well as advantageous properties including hydrolysis resistance, thermal stability, and workability. The hydrolysis resistance is described in detail. As previously described, in general, silazane compounds are inherently susceptible to water so that Si-N-Si bonds undergo hydrolysis to form Si-O-Si bonds while giving off ammonia. If fibers are prepared from such silazane compounds, the resulting fibers have a markedly increased surface area which is undesirable from the standpoint of fiber quality. In contrast, the organic silazane polymer of the invention is least prone to hydrolysis, that is, has higher hydrolysis resistance than the precursor disclosed in U.S. Pat. No. 3,853,567.

Next, inorganic fibers are prepared from the organic silazane polymer prepared by the above-mentioned method through melt spinning, infusibilizing and sintering.

The organic silazane polymer may be melt spun into green filaments or fibers by any conventional well-known method. The polymer is preferably melted at a temperature which is 30° to 150° C. higher than its melting point.

It is undesirable that a ceramic precursor changes its melting point and molecular weight during melt spinning, because it becomes difficult to produce ceramic fibers of consistent quality and frequent breakage occurs during spinning. In this respect, the organic silazane polymer of the invention is advantageous since it experiences little or no change of melting point and molecular weight during melt spinning.

The green filaments or fibers melt spun from the polymer are the sintered into inorganic form at high temperatures. For conversion into inorganic form with the filament shape maintained, the filaments should be made infusible before sintering.

For infusibilization, air oxidation is generally employed. In the practice of the invention, fibers of the organic silazane polymer are preferably made infusible by oxidizing in air at a temperature of 200° to 280° C., more preferably 240° to 270° C. Infusibilizing temperatures of higher than 280° C. can cause excess oxygen to incorporate into the fibers so that the fibers lose strength or deteriorate in quality. Temperatures of lower than 200° C. are insufficient to render the fibers infusible so that the fibers might fuse together during subsequent sintering.

The fibers can also be infusibilized by ozone oxidation. Ozone oxidation allows the fibers to become infusible at a temperature of 0° to 70° C., typically room temperature.

Further, infusibilizing methods as disclosed in Japanese Patent Application Kokai Nos. 14220/1990 and 34565/1990 are also useful. Preferably, fibers are made infusible by treating them with a gas containing at least one vapor selected from silicon compounds of the general formula (2) shown below and then with humid air or ammonia-containing gas. More particularly, the as-spun filaments or fibers are subjected to a first infusibilizing step using an infusibilizing agent in the form of a silicon compound of formula (2), that is, the fibers are treated with a gas containing the silicon compound vapor. Then in a second step, the fibers are treated with humid air or ammonia-containing gas.

The infusibilizing agent used is a silicon compound of the following formula:

$$R_a SiX_{4-a} \qquad (2)$$

wherein R is a hydrogen atom, lower alkyl group, alkenyl group or aryl group, X is a chlorine atom, bromine atom or iodine atom, and letter a is a number of 0 to 2, with the proviso that R's may be the same or different when a is equal to 2. Examples of the silicon compound of formula (2) include $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, and $(CH_2=CH) C_6H_5SiCl_2$. They may be used alone or in admixture of two or more. The preferred infusibilizing agents are $HSiCl_3$ and $SiCl_4$.

The fibers may be treated with a gas containing the infusibilizing agent in any desired manner. For example, an inert gas such as nitrogen ($N_2$) and argon (Ar) may be used as a carrier gas. The carrier gas is passed into the infusibilizing agent and then to a region where the fibers are placed whereupon the fibers are contacted with the carrier gas having the vapor of the agent carried thereon. The concentration of the infusibilizing agent in the gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.001 to 0.1 mol of the agent per liter of the carrier gas. The treating temperature and time vary with a particular type of organic silazane polymer used. Usually, the treating temperature is a sufficiently low temperature to maintain the polymer infusible, that is, a temperature sufficiently lower than the melting point of the polymer. The treating time is a sufficient time to render the fibers substantially infusible, preferably about 5 to about 240 minutes.

At the end of the first infusbilizing step, the polymer fibers become insoluble in commonly used solvents, for example, benzene, hexane, toluene, and tetrahydrofuran (THF). However, the polymer fibers resulting from only the first infusibilizing step is not fully infusible and will melt during subsequent pyrolysis. The second step of treating with humid air or an ammonia-containing gas is essential to enhance the infusibility of polymer fibers.

The manner of treatment in the second step is not particularly limited. In the case of treatment with humid air, for example, the fibers resulting from the first infusibilizing step may be simply exposed in air for a predetermined time to render the fibers completely infusible. The air exposure is simple, but somewhat difficult to consistently yield ceramic fibers having high strength and modulus because the humidity in air is not always constant. Due to varying humidity, subsequent pyrolysis will result in fibers having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the fibers for a sufficient time to complete infusibilization. Usually, the treating temperature is a temperature sufficiently lower than the melting point of the polymer. The treating time is a sufficient time to complete infusibilization, preferably about 5 to about 240 minutes. The temperature of water into which air or inert gas is bubbled at the predetermined rate may preferably vary over the range of 0° to 100° C., more preferably 0° to 70° C., most preferably 0° to 30° C.

In the case of ammonia gas treatment, infusibilizing may be completed by exposing the fibers resulting from the first infusibilizing step to ammonia gas or ammonia gas diluted with an inert gas. In the second step, the ammonia gas concentration preferably ranges from 0.01 to 100% by volume, more preferably from 0.2 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the fibers for a sufficient time to complete infusibilization. The treating temperature and time are approximately the same as described for the humid air treatment.

The polymeric fibers thus made infusible are then fired at elevated temperatures for pyrolysis with or without tension applied thereto, yielding ceramic fibers.

In one embodiment, the organic silazane polymers may be shaped into fibers and infusibilized by the above-mentioned procedure. The resulting infusible fibers are sintered at high temperatures under tension or in free state, resulting in ceramic fibers consisting essentially of Si, C, and N, more illustratively, composed mainly of SiC and $Si_3N_4$ and having high strength and modulus. Sintering is preferably carried out in vacuum or in an inert gas such as argon and nitrogen ($N_2$) or in an atmosphere of hydrogen ($H_2$) gas at a temperature of about 700° to about 2000° C., more preferably about 700° to about 1600° C. Most often the infusible fibers are sintered under tension. Under such preferred conditions, there are produced inorganic fibers of quality as typified by a tensile strength of 280 kg/mm$^2$ or higher and a modulus of elasticity of 19 t/mm$^2$ or higher.

In another embodiment, the organic silazane polymers may be shaped into fibers and infusibilized by the above-mentioned procedure. The resulting infusible fibers are sintered in an ammonia-containing atmosphere at high temperatures under tension or in free state, resulting in ceramic fibers consisting essentially of Si and N, more illustratively, composed mainly of $Si_3N_4$ and having high strength and modulus. Sintering is carried out in ammonia ($NH_3$) gas or in an inert gas (such as nitrogen and argon) containing ammonia ($NH_3$) at a temperature of about 700° to about 2000° C., more preferably about 700° to about 1600° C. The inner atmosphere preferably has an ammonia concentration of 10 to 100% because an ammonia concentration of lower than 10% would result in sintered fibers having carbon left therein. Most often the infusible fibers are sintered under tension. Under such preferred conditions, there are produced silicon nitride base fibers of quality as typified by a tensile strength of 260 kg/mm$^2$ or higher and a modulus of elasticity of 18 t/mm$^2$ or higher.

There has been described a method for preparing an organic silazane polymer useful as an inorganic fiber precursor, which has many commercial advantages in that the organic silazane polymer is highly resistant against hydrolysis, well workable, especially spinnable, and thermally stable so that in melt spinning, the polymer or precursor undergoes no or little change in melting point and molecular weight throughout the spinning period and can be drawn to a satisfactory extent.

The organic silazane polymer obtained by the present method can be melt spun, infusibilized, and sintered into ceramic fibers of quality consisting essentially of Si, C, and N and characterized by a tensile strength of at least 280 kg/mm$^2$, a modulus of elasticity of at least 19 t/mm$^2$, and high-temperature strength, or silicon nitride fibers of quality consisting essentially of Si and N and characterized by a tensile strength of at least 260 kg/mm$^2$, a modulus of elasticity of at least 18 t/mm$^2$, high-temperature strength, and high ceramic retention, both in a commercially efficient manner.

The apparatus of the invention is of simple construction and permits such a silazane polymer to be produced in a simple and efficient manner.

EXAMPLE

Examples of the present invention are given below by way of illustration and not by way of limitation. Unless otherwise stated, percents are by weight.

Example 1

The apparatus shown in FIG. 1 was used. The reactor vessel 1 was charged with 50 grams of hexamethyldisilazane. The quartz tube 3 was heated and maintained at 680° C. by means of the electric furnace 4, and the reactor vessel 1 was gradually heated by means of the heating mantle 2 until the hexamethyldisilazane boiled. The reactor vessel interior had a temperature of 125° C. at this point. The temperature of the reactor vessel interior was gradually raised so that boiling continued.

Figure 2:
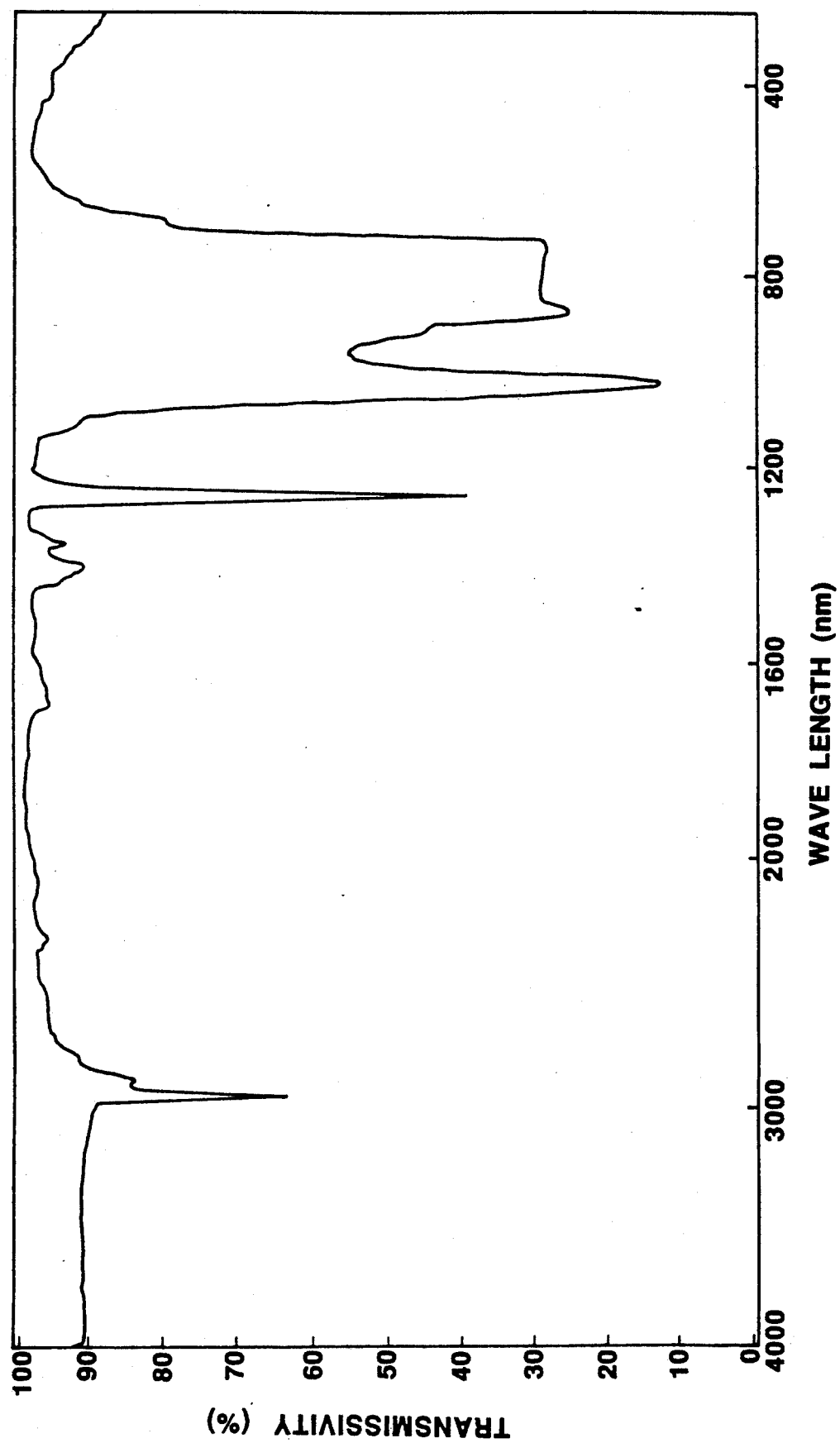
FIG. 2 shows an IR spectrum of organic silazane polymer A obtained in Example 1.

After the interior temperature reached 450° C., the reaction was further continued for about 5 hours. When the evaporation from within the reactor vessel 1 marked a sudden drop, the reaction was terminated by cooling. The reactor vessel 1 was removed from the apparatus of FIG. 1 and connected to a distillation apparatus. Low molecular weight components were distilled off at 300° C. in vacuum (1 mmHg), leaving 28 grams (yield 56.0%) of a brown solid which is designated organic silazane polymer A. This organic silazane polymer A had a melting point of 258° C., a weight average molecular weight of 2,790, and a number average molecular weight of 1,540, and were soluble in hexane, benzene, THF, and other organic solvents. An IR spectrum of organic silazane polymer A is shown in FIG. 2.

Example 2

Figure 3:
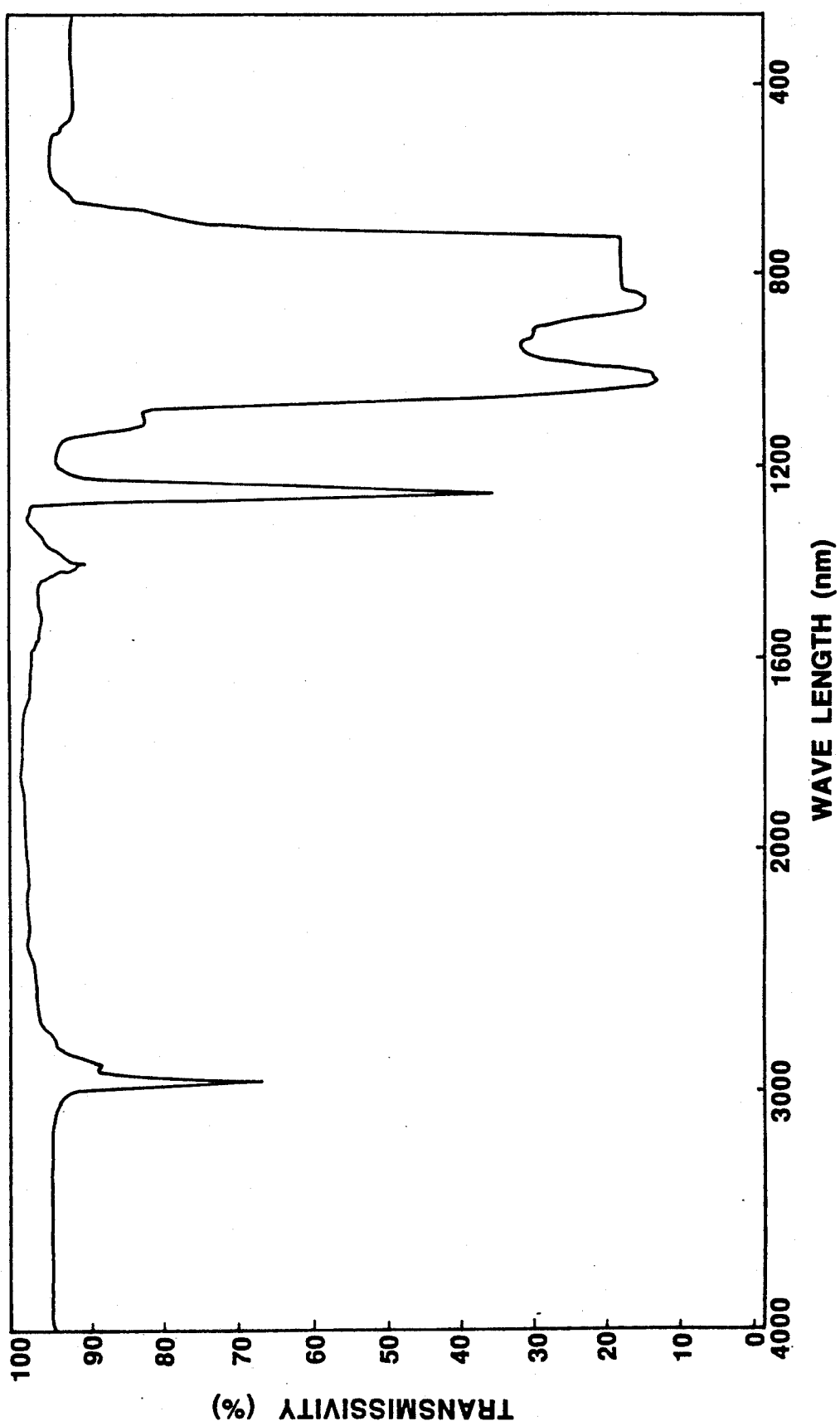
FIG. 3 shows an IR spectrum of organic silazane polymer B obtained in Example 2.

Reaction was carried out in the apparatus of FIG. 1 by the same procedure as in Example 1 except that 50 grams of hexamethylcyclotrisilazane was used. The quartz tube was maintained at a temperature of 570° C. The reactor vessel interior temperature was initially controlled at 190° C. and then gradually raised so that boiling continued. The reaction was terminated when the interior temperature reached 480° C. Low molecular weight components were distilled off at 350° C. in a nitrogen atmosphere, leaving 39.4 grams (yield 78.8%) of a brown solid which is designated organic silazane polymer B. This organic silazane polymer B had a melting point of 284° C., a weight average molecular weight of 7,130, and a number average molecular weight of 1,580, and were soluble in organic solvents like polymer A of Example 1. An IR spectrum of organic silazane polymer B is shown in FIG. 3.

Example 3

As in Example 1, the reactor vessel 1 in the apparatus of FIG. 1 was charged with 50 grams of hexamethyldisilazane. The quartz tube was heated and maintained at a temperature of 680° C. The reactor vessel was gradually heated. After the reactor interior temperature reached 480° C., the reaction was continued for about 10 hours. Then the evaporation from within the reactor vessel 1 marked a sudden drop. The reaction product was concentrated under atmospheric pressure and cooled, leaving 32.4 grams (yield 64.8%) of a brown solid which is designated organic silazane polymer C. This organic silazane polymer C had a melting point of 240° C., a weight average molecular weight of 6,900, and a number average molecular weight of 1,430.

Comparative Example 1

Figure 4:
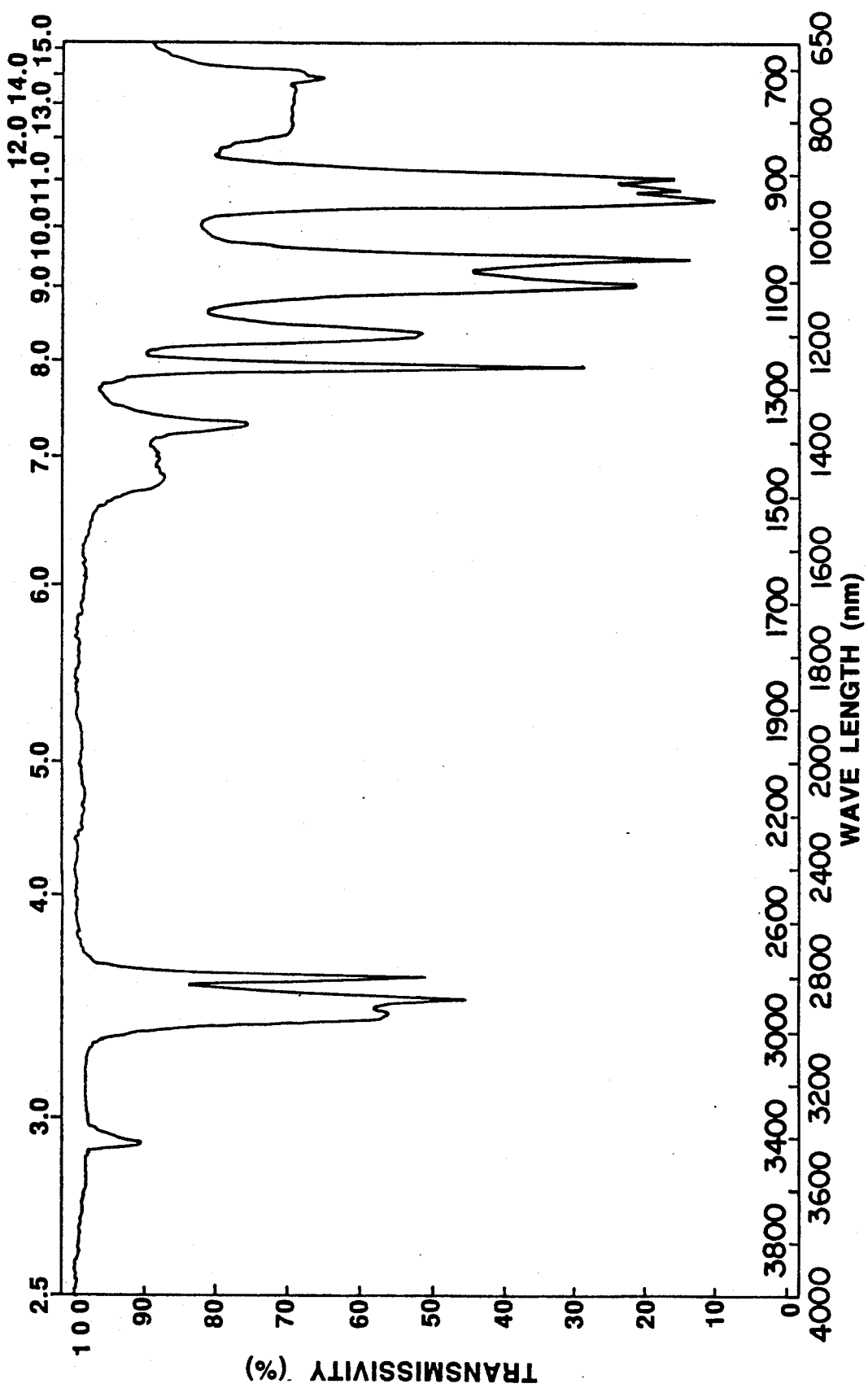
FIG. 4 shows an IR spectrum of the crystalline substance obtained in Comparative Example 1.

The quartz tube in the apparatus of FIG. 1 was packed with Raschig rings having a diameter of 8 mm and a height of 8 mm. The reactor vessel was charged with 50 grams of methyltrismethylaminosilane $CH_3Si(NHCH_3)_3$. Reaction was effected as in Example 1. The quartz tube was maintained at a temperature of 450° C. The reactor interior temperature was initially controlled at 85° C. After about 6 hours of reaction, the quartz tube seemed to substantially clog and so, the reaction was terminated. After cooling down, the apparatus was disassembled to examine the interior to find an insoluble, infusible solid deposit at the center of the quartz tube, suggesting that the tube was just before clogging. A large amount of white crystalline substance deposited on the inner wall of the reactor vessel in contact with the gas phase. It was purified by recrystallization and analyzed to have a melting point of 130°–133° C., a molecular weight of 312 as measured by the benzene cryoscopy, and an elemental analysis: Si 27.8%, C 34.8%, N 26.4%, and H 10.1%. It was thus identified to be the compound of formula (1) previously defined. An IR spectrum of the formula (1) compound is shown in FIG. 4.

Figure 5:
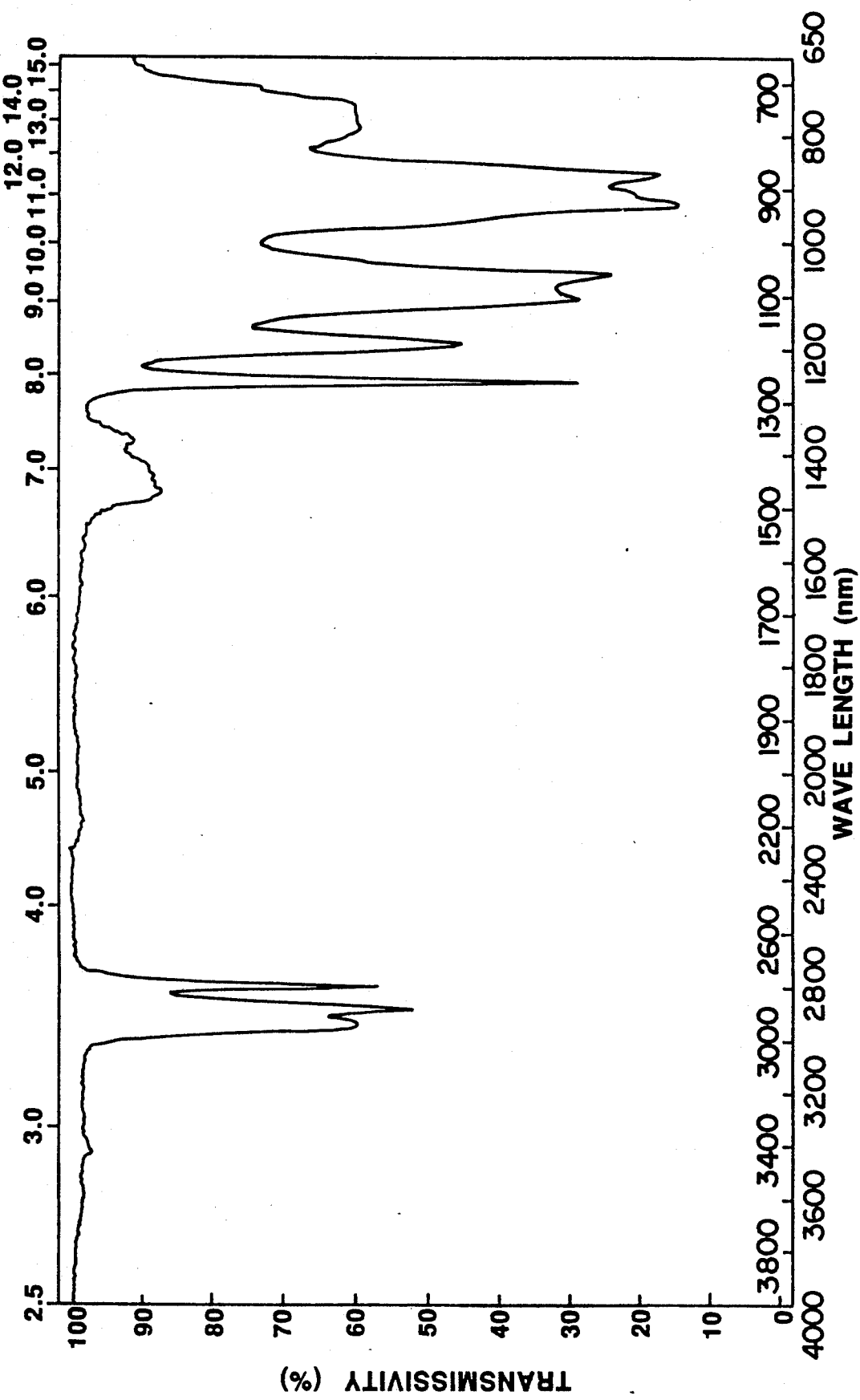
FIG. 5 shows an IR spectrum of organic silazane polymer D obtained in Comparative Example 1.

The viscous liquid left in the reactor vessel was worked up as in Example 1, obtaining 24.2 grams (yield 48.4%) of a solid which is designated organic silazane polymer D. This polymer D gave off a foul ammonia smell in air and had a melting point of 116° C., a weight average molecular weight of 1,030, and a number average molecular weight of 820. An IR spectrum of polymer D is shown in FIG. 5.

Comparative Example 2

The reactor vessel in the apparatus of FIG. 1 was charged with 47 grams of methyltrismethylaminosilane $CH_3Si(NHCH_3)_3$. As in Comparative Example 1, the quartz tube was maintained at a temperature of 520° C. and the reactor interior temperature was initially controlled at 85° C. Reaction could continue for about 8 hours without clogging of the quartz tube. The reactor interior temperature finally reached 450° C. After cooling down, it was found that a white crystalline substance deposited on the gas phase-defining inner wall portion of the reactor vessel as in Comparative Example 1. It weighed 9.8 grams (20.9%).

The polymer left in the reactor vessel was worked up as in Example 1, obtaining 17.0 grams (yield 36.2%) of a solid which is designated organic silazane polymer E. This polymer E gave off a foul ammonia smell in air and had a melting point of 147° C., a weight average molecular weight of 1,220, and a number average molecular weight of 970.

Comparative Example 3

Reaction was effected by the same procedure as in Comparative Example 1 except that the reactor vessel was charged with 50 grams of hexamethylcyclotrisilazane. After about 10 hours of reaction, the quartz tube clogged so that the reaction could be continued no longer.

The viscous liquid left in the reactor vessel was worked up as in Comparative Example 1, obtaining 21.3 grams (yield 42.6%) of a solid which is designated organic silazane polymer F. This polymer F gave off a foul ammonia smell in air.

Hydrolysis test

The organic silazane polymers obtained in Examples 1 and 2 and Comparative Example 2 were examined for hydrolysis resistance. Each organic silazane polymer was finely divided into a powder passing a 325-mesh screen. The powder was exposed to atmospheric humid air under predetermined conditions and then sintered into a ceramic material which was subjected to elemental analysis. The results are shown in Table 1.

TABLE 1

| Organic silazane polymer | | No exposure | | 2-day exposure RH 74% | | 7-day exposure RH 52% | |
|---|---|---|---|---|---|---|---|
| | | N | O | N | O | N | O |
| E1 | A | 10.7 | 1.1 | 12.2 | 1.3 | 11.1 | 1.2 |
| E2 | B | 20.5 | 1.7 | 20.4 | 1.7 | 20.5 | 1.7 |
| CE2 | E | 29.3 | 1.2 | 22.2 | 8.6 | 22.2 | 9.3 |

As is evident from the data of Table 1, the organic silazane polymers of the invention are fully resistant against hydrolysis.

Next, the organic silazane polymers or precursors obtained in the foregoing Examples and Comparative Examples were processed into fibers which were evaluated for performance.

Example 4

Organic silazane polymer A obtained in Example 1 was heated at 350° C. and melt spun through a spinneret having an orifice of 0.2 mm in diameter. No breakage occurred during spinning over about one hour. The green filament had a diameter of 11 to 12 $\mu$m. Pieces of the filament weighing 0.1 to 0.2 grams were rested on an alumina boat, which was loaded in a mullite tube furnace having a diameter of 50 mm. While passing air through the furnace, the furnace was heated from 200° C. to 260° C. over six hours and maintained at the temperature for one hour thereby rendering fibers infusible. Thereafter, the furnace interior was purged with an inert gas ($N_2$ or Ar) and heated to 1,200° C. over six hours for sintering, obtaining ceramic fibers. The ceramic fibers had a diameter of about 10 $\mu$m, a tensile strength of 280 kg/mm$^2$, and a modulus in tension of 19 ton/mm$^2$. The fibers were found to have a composition of Si 65.4%, C 22.1%, N 10.5%, and O 2.0%, consisting essentially of SiC and $Si_3N_4$.

Example 5

Figure 6:
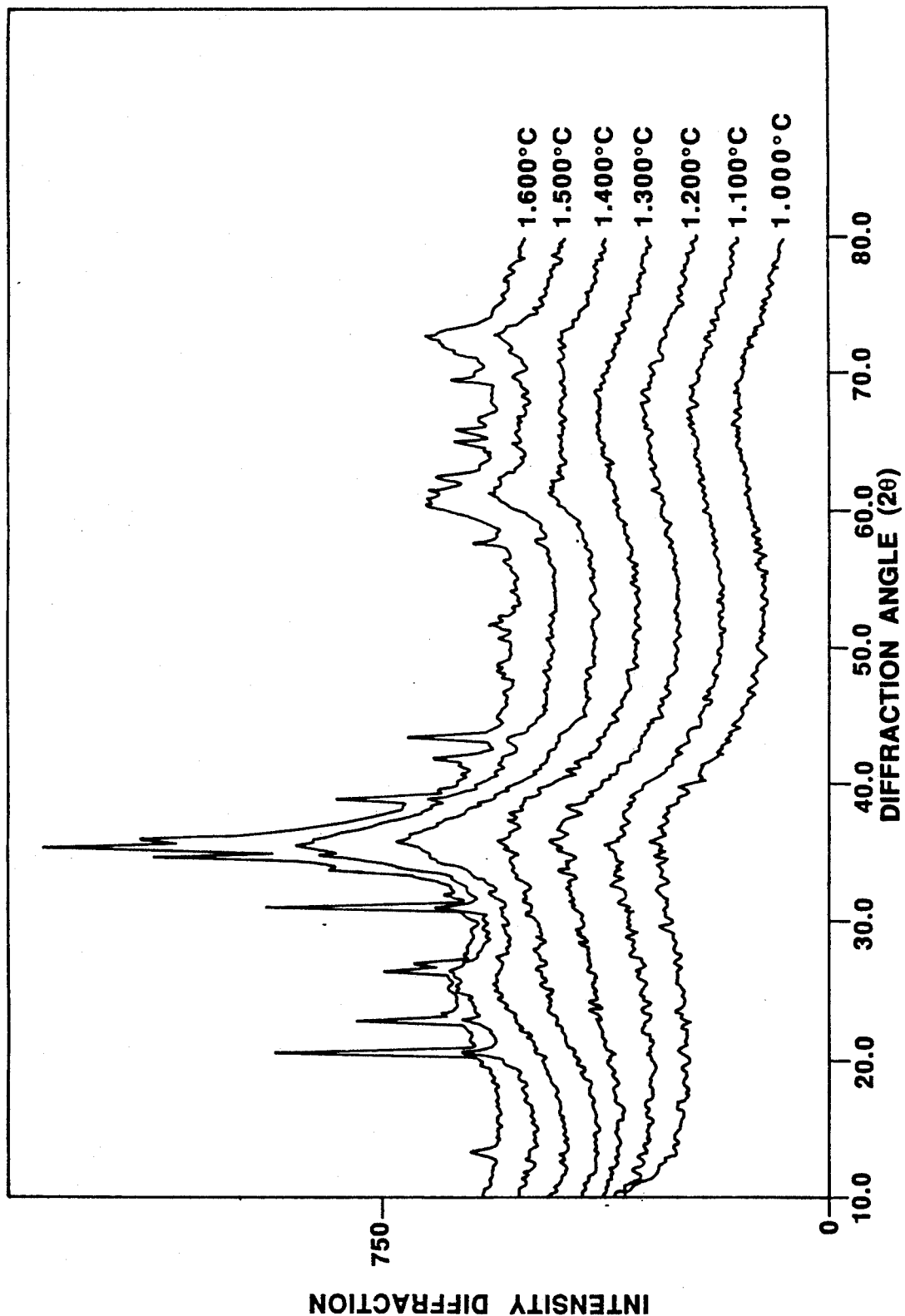
FIG. 6 is an X-ray diffraction diagram of the ceramic fiber obtained in Example 5.

Organic silazane polymer B obtained in Example 2 was converted into fiber form by the same procedure as in Example 4. Ceramic fibers having a diameter of 9 $\mu$m were obtained by sintering at 1000° C. They had a tensile strength of 290 kg/mm$^2$ and a modulus in tension of 21 ton/mm$^2$. Fibers were similarly prepared by sintering at temperatures of from 1,000° to 1,600° C. at intervals of 100° C. before X-ray diffraction analysis. As is evident from the X-ray diffraction diagram of FIG. 6, the fibers remained amorphous at sintering temperatures of up to 1,400° C., and diffraction peaks of SiC and $Si_3N_4$ appeared at the sintering temperature of 1,600° C.

Comparative Example 4

Organic silazane polymer D obtained in Comparative Example 1 was melt spun at 200° C. as in Example 4. A green filament having a diameter of about 12 $\mu$m could be spun at the initial, but the filament thinned down with the lapse of time and eventually snapped. After the spinning bath was cooled down, it was found that the polymer therein had been increased in melting point and molecular weight, as evidenced by a melting point of 180° C. and a number average molecular weight of 980. There was obtained only a relatively short length of filament, which was infusibilized and sintered as in Example 4. The fibers were fused together at the end of sintering. The portion of the fiber which was left unfused was measured to have a tensile strength of 90 kg/mm$^2$ and a modulus of elasticity of 8 ton/mm$^2$.

Example 6

Organic silazane polymer C obtained in Example 3 was melt spun at 330° C. as in Example 4. The resulting filament was oxidized by passing ozone which was generated from oxygen gas by means of an ozone generator model EQ-301 (manufactured by Okano Mfg. K.K.) at room temperature (18° C.). The filament was heated in a nitrogen atmosphere from room temperature to 1,200° C. over six hours and then sintered at 1,200° C. for one hour, obtaining inorganic fibers having a diameter of 12 $\mu$m. They showed a tensile strength of 300 kg/mm$^2$ and a modulus of elasticity of 20 ton/mm$^2$.

Example 7

Organic silazane polymer C obtained in Example 3 was melt spun at 330° C. as in Example 4. The resulting filament had a diameter of 12 to 13 $\mu$m. Pieces of the filament were rested on an alumina boat, which was loaded in a mullite tube furnace having a diameter of 50 mm. After the furnace was purged with nitrogen gas, a first infusibilizing step was carried out by bubbling nitrogen gas through a bubbler filled with trichlorosilane to form a nitrogen gas containing 0.01 mol/liter of trichlorosilane gas and passing the trichlorosilane-loaded nitrogen gas through the furnace at room temperature for 15 minutes. After the furnace was purged with nitrogen gas again, a second infusibilizing step was carried out by bubbling air into water at 25° C. and passing the humid air over the fibers at 50° C. at a flow rate of 13 liter/hour for 30 minutes. The fibers were rendered infusible in this way. After the furnace was purged with nitrogen gas again, the furnace was heated to 1,200° C. at a rate of 150° C./hour in a nitrogen stream whereby the fibers were pyrolyzed at the temperature for 30 minutes. After cooling down, the inorganic fibers resulting from sintering had a diameter of 9.3 $\mu$m, a tensile strength of 290 kg/mm$^2$, and a modulus in tension of 25 ton/mm$^2$.

Example 8

Organic silazane polymer C obtained in Example 3 was melt spun as in Example 7. The filament was subjected to a first infusibilizing step by treating with trichlorosilane as in Example 7 and after nitrogen purging, to a second infusibilizing step by passing a nitrogen gas containing 1% ammonia at room temperature at a flow rate of 1 liter/hour for 30 minutes. The fibers were rendered infusible in this way. After the furnace was purged with nitrogen gas again, the fibers were fired as in Example 7. The resulting inorganic fibers had a diameter of 10 $\mu$m, a tensile strength of 300 kg/mm$^2$, and a modulus in tension of 26 ton/mm$^2$.

Example 9

Organic silazane polymer A obtained in Example 1 was heated at 350° C. and melt spun through a spinneret having an orifice of 0.2 mm in diameter. No breakage occurred during spinning over about one hour. The green filament had a diameter of 10 $\mu$m. Pieces of the filament weighing 0.1 grams were rested on an alumina boat, which was loaded in a mullite tube furnace having a diameter of 50 mm. While passing air through the furnace, the furnace was heated from 200° C. to 260° C. over six hours and maintained at the temperature for one hour thereby rendering fibers infusible. Thereafter, the furnace was interior was purged with an inert gas ($N_2$ or Ar). While passing an argon gas containing 20% ammonia, the furnace was heated to 1,200° C. over six hours for sintering, obtaining ceramic fibers. The ceramic fibers had a diameter of about 9 $\mu$m, a tensile strength of 260 kg/mm$^2$, and a modulus in tension of 18 ton/mm$^2$. The fibers were found to have a composition of Si 59.5%, C 0.1%, N 38.4%, and O 2.0%, consisting essentially of $Si_3N_4$.

Example 10

Figure 7:
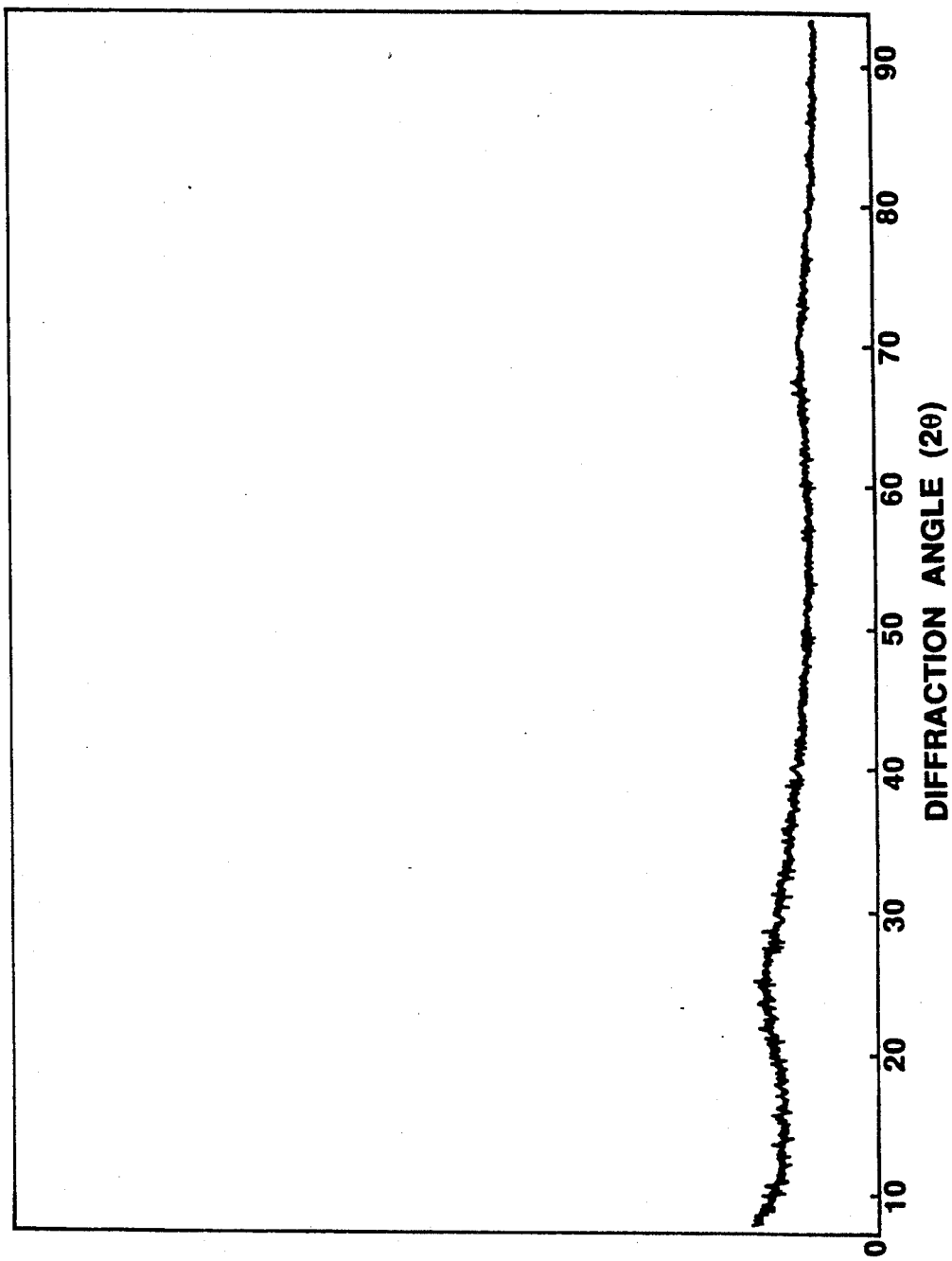
FIGS. 7 and 8 are X-ray diffraction diagrams of the silicon nitride ceramic fibers obtained in Example 10.
Figure 8:
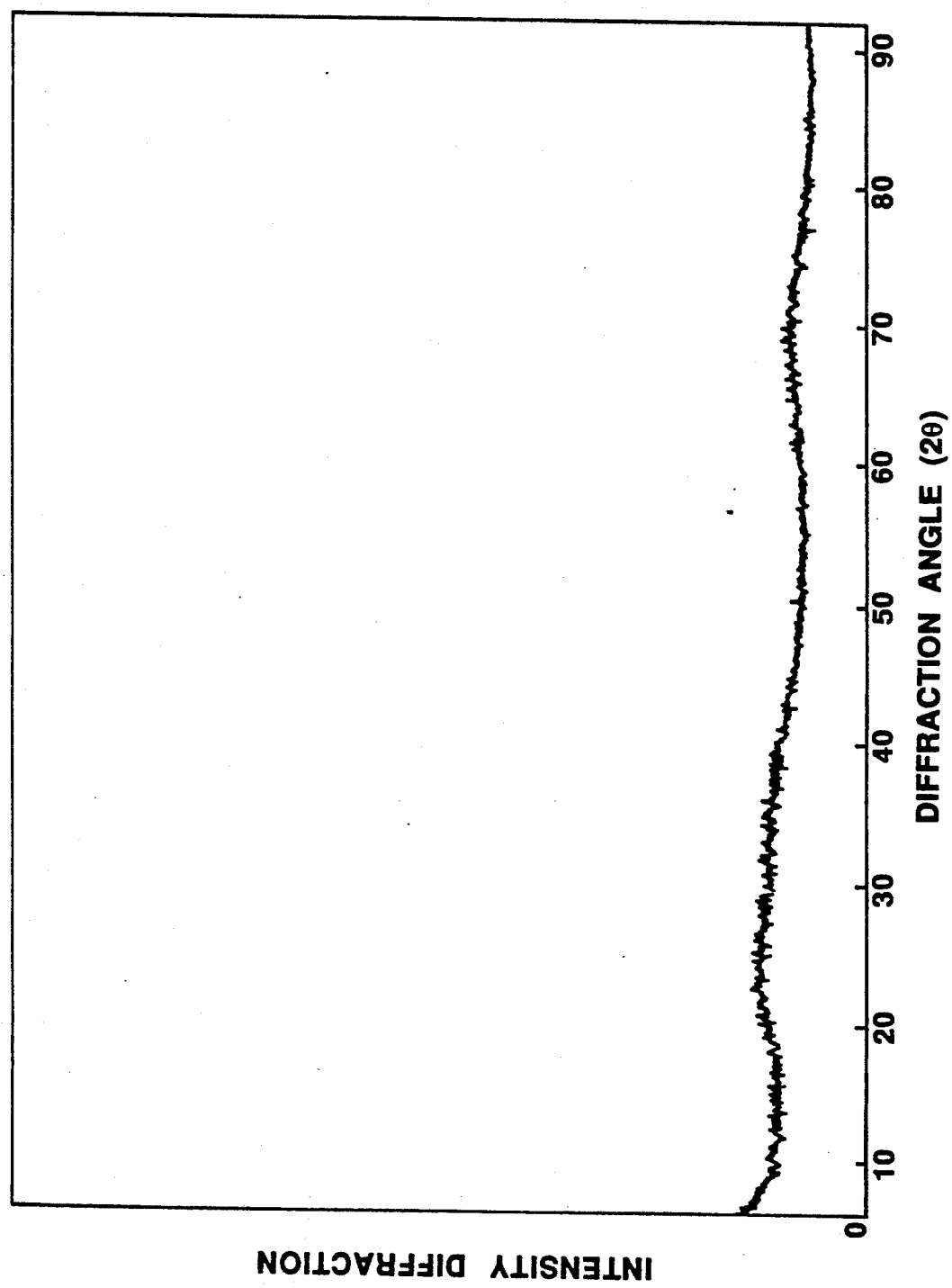

Organic silazane polymer B obtained in Example 2 was converted into fiber form by the same procedure as in Example 9. Ceramic fibers of silicon nitride having a diameter of 9 μm were obtained by sintering at 1000° C. They had a tensile strength of 285 kg/mm² and a modulus in tension of 20 ton/mm². Fibers were similarly prepared by sintering at temperatures of 1,200° C. and 1,580° C. before X-ray diffraction analysis. As is evident from the X-ray diffraction diagrams of FIGS. 7 and 8, the fibers remained amorphous even at the sintering temperature of 1,580° C.

Comparative Example 5

Organic silazane polymer D obtained in Comparative Example 1 was melt spun at 200° C. as in Example 9. A filament having a diameter of about 12 μm could be spun at the initial, but the filament thinned down with the lapse of time and eventually snapped. After the spinning bath was cooled down, it was found that the polymer therein had been increased in melting point and molecular weight, as evidenced by a melting point of 180° C. and a number average molecular weight of 980. There was obtained only a relatively short length of filament, which was infusibilized and sintered as in Example 9. The fibers were fused together at the end of sintering. The portion of the fiber which was left unfused was measured to have a tensile strength of 40 kg/mm² and a modulus of elasticity of 7 ton/mm².

Example 11

Organic silazane polymer C obtained in Example 3 was melt spun at 330° C. as in Example 9. The resulting filament was oxidized by generating ozone from oxygen gas by means of an ozone generator model EQ-301 (manufactured by Okano Mfg. K.K.) at room temperature (18° C.) and passing the oxygen gas containing 1.5% ozone at a flow rate of 100 ml/min. The filament was heated in ammonia gas from room temperature to 1,200° C. over six hours and then fired at 1,200° C. for one hour, obtaining silicon nitride fibers having a diameter of 12 μm. They showed a tensile strength of 280 kg/mm² and a modulus of elasticity of 18 ton/mm².

Example 12

Organic silazane polymer C obtained in Example 3 was melt spun at 330° C. as in Example 9. The resulting filament had a diameter of 12 to 13 μm. Pieces of the filament were rested on an alumina boat, which was loaded in a mullite tube furnace having a diameter of 50 mm. After the furnace was purged with nitrogen gas, a first infusibilizing step was carried out by bubbling nitrogen gas through a bubbler filled with trichlorosilane to form a nitrogen gas containing 0.01 mol/liter of trichlorosilane gas and passing the trichlorosilane-loaded nitrogen gas through the furnace at room temperature for 15 minutes. After the furnace was purged with nitrogen gas again, a second infusibilizing step was carried out by bubbling air into water at 25° C. and passing the humid air over the fibers at 50° C. at a flow rate of 13 liter/hour for 30 minutes. The fibers were rendered infusible in this way. After the furnace was purged with nitrogen gas again, the furnace was heated to 1,200° C. at a rate of 150° C./hour in a nitrogen stream whereby the fibers were pyrolyzed at the temperature for 30 minutes. After cooling down, the silicon nitride fibers resulting from sintering had a diameter of 10 μm, a tensile strength of 280 kg/mm², and a modulus in tension of 22 ton/mm².

Example 13

Organic silazane polymer C obtained in Example 3 was melt spun as in Example 12. The filament was subjected to a first infusibilizing step by treating with trichlorosilane as in Example 12 and after nitrogen purging, to a second infusibilizing step by passing a nitrogen gas containing 1% ammonia at room temperature and a flow rate of 1 liter/hour for 30 minutes. After the fibers were rendered infusible in this way, the ammonia concentration was increased to 60% and the fibers were sintered as in Example 12. The resulting silicon nitride fibers had a diameter of 9 μm, a tensile strength of 290 kg/mm², and a modulus in tension of 24 ton/mm².

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method for preparing an organic silazane polymer comprising the steps of:

passing a silazane compound having the structure

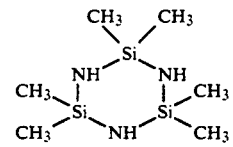

in vapor form through a hollow tube heated at a temperature in the range of from 400° to 700° C. for activating the silazane compound, and thermally polymerizing the silazane compound in a liquid phase at a temperature of 300° to 600° C.

* * * * *